A. E. HANSON.
DITCHING MACHINE.
APPLICATION FILED MAR. 16, 1912.
1,048,408.
Patented Dec. 24, 1912.
2 SHEETS—SHEET 1.
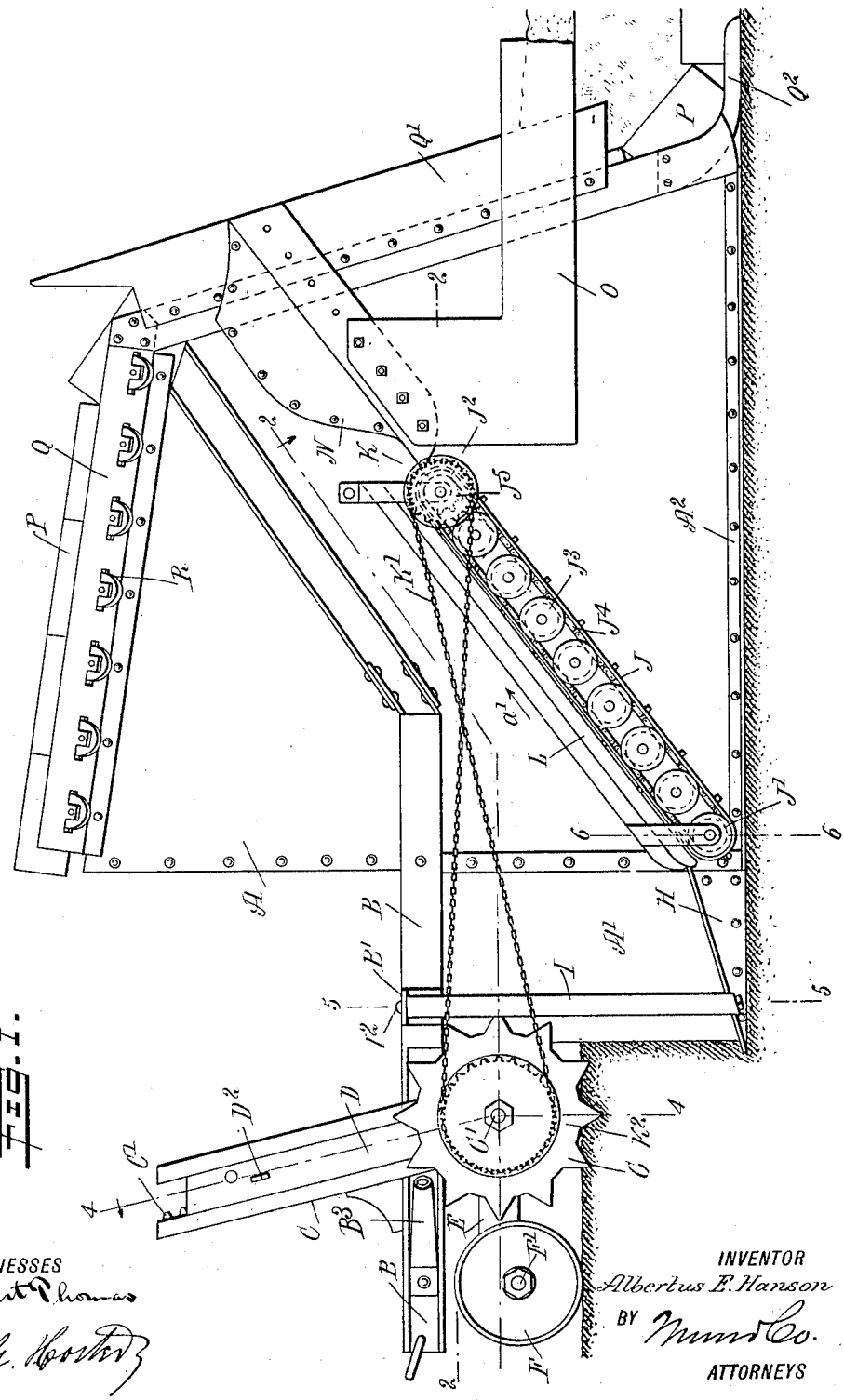
WITNESSES
INVENTOR
Albertus E. Hanson
BY
Munn & Co.
ATTORNEYS

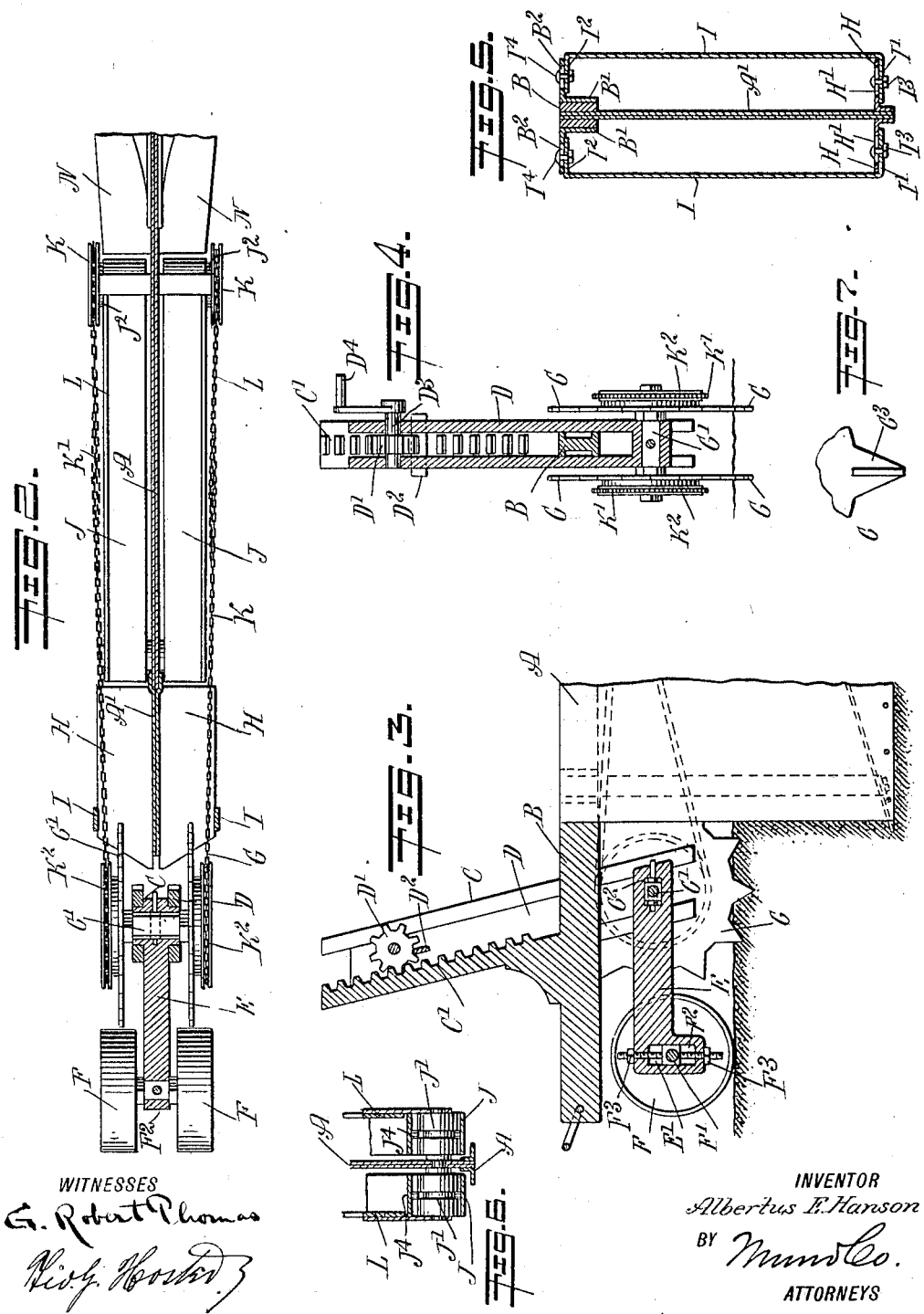

UNITED STATES PATENT OFFICE.

ALBERTUS E. HANSON, OF MASON CITY, IOWA.

DITCHING-MACHINE.

1,048,408.  Specification of Letters Patent.  Patented Dec. 24, 1912.

Application filed March 16, 1912. Serial No. 684,103.

*To all whom it may concern:*

Be it known that I, ALBERTUS E. HANSON, a citizen of the United States, and a resident of Mason City, in the county of Cerro Gordo and State of Iowa, have invented a new and Improved Ditching-Machine, of which the following is a full, clear, and exact description.

The object of the invention is to provide a new and improved ditching machine arranged to readily form the ditch to any desired depth, and to divide the material and deliver the same to opposite sides of the ditch in a very simple and economical manner. For the purpose mentioned use is made of a plate provided with a plow beam, a traction wheel on the plow beam, a cutting device on the front of the said plate, a traveling conveyer on the said plate and extending rearwardly and upwardly from the said cutting device, and a connection between the said conveyer and the said traction wheel to actuate the conveyer from the traction wheel.

A practical embodiment of the invention is represented in the accompanying drawings forming a part of this specification, in which similar characters of reference indicate corresponding parts in all the views.

Figure 1 is a side elevation of the ditching machine as applied and arranged in connection with a tile distributer; Fig. 2 is a sectional plan view of the same on the line 2—2 of Fig. 1; Fig. 3 is a sectional side elevation of the raising and lowering mechanism; Fig. 4 is a transverse section of the same on the line 4—4 of Fig. 1; Fig. 5 is a cross section of the cutting device on the line 5—5 of Fig. 1; Fig. 6 is a cross section of part of the conveyer on the line 6—6 of Fig. 1; and Fig. 7 is a perspective view of a modified form of traction wheel.

A center plate A of a suitable height and length is provided at its forward lower portion with an extension plate A' and at the bottom with base flanges $A^2$ adapted to travel on the bottom of the ditch so as to keep the center plate A in proper central position while the machine is drawn forward. On the center plate A and its extension plate A' is secured a forwardly-extending plow beam B for the attachment of a team or other means to draw the ditching machine forward with a view to form the ditch, as hereinafter more fully explained. The plow beam B is provided with a forwardly inclined and upwardly-extending guideway C in which is mounted to slide up and down a slide D provided at its lower end with a horizontal extension E carrying the axle F' of guide wheels F adapted to travel on the ground below the front end of the plow beam B, as plainly shown in Fig. 1. The lower end of the guideway C supports an axle G' on which are journaled traction wheels G on oposite sides of the plow beam, the traction wheels being preferably toothed to readily dig into the ground so that a rotary motion is given to the traction wheels G on drawing the machine forward. The guide wheels F and the traction wheels G can be readily raised or lowered on raising or lowering the slide D so as to form a ditch of more or less depth. For the purpose mentioned, the guideway C is provided with a rack C' in mesh with a pinion D' journaled on the slide D and adapted to be locked against rotation by a transverse pin $D^2$ removably mounted in the slide D and adapted to pass between adjacent teeth of the pinion D' to hold the latter against rotation (see Fig. 3). The shaft $D^3$ of the pinion D' is provided with a polygonal end for the application of a crank $D^4$ to permit of turning the pinion D' for raising or lowering the slide D. When it is desired to adjust the machine for forming a ditch of more or less depth, then the pin $D^2$ is withdrawn to unlock the pinion D' and to allow turning of the same by the crank $D^4$ and moving the slide D up or down in the guideway C until the bottom of the plate A and its extension plate A' is the desired distance from the bottom of the traction wheels G and which distance indicates the depth of the ditch (see Figs. 1 and 3). After the desired adjustment is made, the pin $D^2$ is replaced to lock the pinion D' against rotation thus holding the slide D locked in position in the guideway C. The axle F' is preferably adjustable in a vertical direction in a guideway E' arranged on the extension E and the said axle F' is held on a screw rod $F^2$ (see Fig. 3) held vertically adjustable on the extension E by nuts $F^3$. The axle G' is longitudinally adjustable by the use of a horizontal screw rod $G^2$ journaled in the rear end of the extension E as shown in Fig. 3.

On the sides of the extension plate A' and at the lower end thereof are secured plowshares H inclined upwardly and rearwardly and serving to plow up the ground to the desired depth, and side cutters I extend vertically from the outer edges of the plowshares H so as to cut the ground in a vertical direction thereby forming the sides of the ditch, the ground also being cut in the middle by the front end of the extension plate A′ so that the ground is divided into two portions passing up the plowshares H on opposite sides of the extension plate A′ and the plate A. The cutters I are preferably in the form of flat bars provided at the lower and upper ends with angular flanges I′ and I², of which the lower flanges I′ are adjustably connected by bolts I³ with the plowshares H by engaging elongated slots H′ in the said plowshares, as plainly indicated in Fig. 5. The upper flanges I² are adjustably connected by bolts I⁴ with brackets B′ secured to the plow beam B, the bolts I⁴ extending through slots B² formed in the side brackets B′. Thus by the arrangement described the cutters I can be adjusted transversely for cutting narrower or wider ditches.

The material cut by the plowshares H and cutters I passes up the plowshares H and finally passes onto endless conveyer belts J arranged on the outside sides of the center plate A and passing around bottom and top rollers J′, J² journaled in suitable bearings carried by the center plate A. The conveyer belts J extend upwardly and rearwardly and pass over idlers J³ intermediate the rollers J′ and J², and each conveyer belt J is provided at its inner face with a sprocket chain J⁴ passing over a sprocket wheel J⁵ on the corresponding upper roller J², and when the rollers J² are driven a positive traveling motion is given to the conveyer belts J. The lower rollers J′ are provided with annular grooves (see Fig. 6) for the passage of the lower ends of the sprocket chains J⁴. The idlers J³ are provided with annular grooves for the passage of the sprocket chains J⁴. On the upper rollers J² are secured sprocket pulleys K connected by crossed chain cables or other flexible connections K′ with sprocket pulleys K² secured to or forming part of the traction wheels G, so that when the machine is drawn forward and the traction wheels G are rotated then a rotary motion is transmitted by the flexible connections K′ and the sprocket pulleys K, K² to the rollers J² to impart a traveling motion to the conveyer belts J in the direction of the arrow a′. The upper runs of the conveyer belts J are flanked by guide boards L supported from the center plate A so that the material carried by the said conveyer belts J in an upward and rearward direction is not liable to fall off the said belts during this upward and rearward movement. The material carried by the conveyer belts is finally discharged at the upper ends thereof onto mold boards N attached to the center plate A, and in order to prevent the plowed up ground or material from falling back into the ditch use is made of rearwardly-extending retaining boards O attached to the mold boards N, and having their lower edges approximately on top of the ground adjacent to the side walls of the ditch.

It is understood that when the machine is drawn forward then the traction wheels G are rotated to actuate the conveyer belts J, and the cutting mechanism consisting of the plowshares H, the cutters I and the extension plate A′ cut the material to form a ditch of a desired depth and width, the cut material being conveyed upwardly and rearwardly by the conveyer belts J and finally delivered by the mold boards N and the retaining boards O to the top of the ground at both sides of the ditch.

The ditching machine may be provided with a tile distributer, but said tile distributer forms no part of the present invention, the same being more fully shown and described in the application for Letters Patent of the United States, Serial No. 618,795, filed by me on April 4, 1911, so that further description of the tile distributer is not deemed necessary, it being sufficient to state that the tiles P are placed into a trough-like guideway Q inclined rearwardly and downwardly on the top of the center plate A, and the rear end of the guideway Q connects with a tubular guideway Q′ held on the rear inclined edge of the center plate A. The tubular guideway Q extends into the ditch and the bottom of the guideway Q′ terminates in trailers Q² which travel along the bottom of the ditch and guide the tiles P onto the bottom of the ditch one in front of the other. The top guideway Q is preferably provided with angularly-disposed friction rollers R for supporting the tiles P one in front of the other.

When the machine is used in very soft ground then the teeth of the traction wheels G are preferably provided with sickle-like flanges G³ (see Fig. 7) adapted to engage the ground and thus provide a firm hold for the traction wheels G to cause the same to rotate on drawing the machine forward. The front end of the plow beam B is preferably provided on its sides with sockets B³ for the reception of guiding handles for steadying and guiding the machine.

Having thus described my invention, I claim as new and desire to secure by Letters Patent:

1. A ditching machine, comprising a plate provided with a plow beam, a traction wheel, a guide wheel in front of the traction wheel, a support mounted to slide up and down on the said plow beam and carrying the said traction wheel and the said guide wheel, a cutting device on the front of the said plate, a traveling conveyer on the said plate and extending rearwardly and upwardly from the said cutting device, and a connection between the said traction wheel and the said conveyer to actuate the latter on rotating the traction wheel.

2. A ditching machine, comprising a center plate provided with a plow beam, a cutting device on opposite sides of the center plate at the front thereof, traveling conveyers on the center plate and extending rearwardly and upwardly from the said cutting device, traction wheels, guide wheels in front of the traction wheels, a support adjustable up and down on the said plow beam and carrying the said traction wheels and the said guide wheels, means for adjusting the said guide wheels in a vertical direction relative to the said traction wheels, and a connection between the traction wheels and the said conveyers.

3. A ditching machine, comprising a center plate, a plow beam on the said center plate, plowshares on the lower front sides of the said center plate, and side cutters adjustably connected at their lower ends with the said plowshares and at their upper ends with the said plow beam, to permit of adjusting the said cutters transversely for cutting narrower or wider ditches.

4. A ditching machine, comprising a center plate, a plow beam on the said center plate, brackets secured to the plow beam, plowshares on the lower front sides of the said center plate, and side cutters rising from the outer edges of the said plowshares and provided at their upper and lower ends with inwardly extending angular flanges, the lower flanges being adjustably connected with the plowshares and the upper flanges of the said side cutters being adjustably connected with the brackets on said plow beam.

5. A ditching machine, comprising a center plate, a plow beam on the said center plate, plowshares on the lower front sides of the said center plate, side cutters rising from the outer edges of the said plowshares, conveyers on the sides of the said center plate and extending rearwardly and upwardly from the rear ends of the said plowshares, traction wheels, guide wheels, connections between the traction wheels and the said conveyers to actuate the latter from the traction wheels, a guideway on the said plow beam, a slide in the said guideway and carrying the said traction wheels and the said guide wheels, means for adjusting the slide to move the traction wheels and the guide wheels relative to the plow beam, and means for locking the slide in the adjusted position.

6. A ditching machine provided with a plate carrying cutting and conveying means, a plow beam on the said plate and provided with a guideway, a slide adjustable up and down in said guideway, an axle carried by the said slide at its lower end, traction wheels journaled on the said axle, the said slide being provided at its lower end with a horizontal extension, and guide wheels having an axle carried by said extension of the slide.

7. A ditching machine provided with a plate carrying cutting and conveying means, a plow beam on the said plate and provided with a forwardly inclined and upwardly extending guideway, a slide mounted on the said guideway, means for raising and lowering the said slide, means for locking the slide in adjusted position, an axle carried by the said slide, traction wheels journaled on the said axle, a forwardly-extending bar on the lower end of the said slide and adjustable therewith, and guide wheels carried by the said bar in front of the traction wheels.

8. A ditching machine provided with a center plate, having base flanges at its bottom, a cutting device on the sides of the said plate at the front end thereof, endless conveyer belts mounted on the sides of the said center plate for carrying the material cut by the said cutting device upward and rearward, mold boards on the sides of the said plate at the upper ends of the said conveyer belts to receive the material from the conveyer belts, rearwardly extending retaining boards attached to the mold boards and having their lower edges approximately on top of the ground adjacent to the side walls of the ditch, the material being delivered by the mold board and the retaining boards to the top of the ground at the sides of the ditch, a plow beam on the said center plate, traction wheels supported from the said plow beam, and driving connections between the said traction wheels and the said conveyer belts.

In testimony whereof I have signed my name to this specification in the presence of two subscribing witnesses.

ALBERTUS E. HANSON.

Witnesses:
S. A. KOCH,
JACOB J. MARTI.

Copies of this patent may be obtained for five cents each, by addressing the "Commissioner of Patents, Washington, D. C."